United States Patent [19]

Raudenbusch et al.

[11] 4,150,006

[45] Apr. 17, 1979

[54] EPOXY RESIN/AMINE ADDUCTS FOR CATIONIC ELECTRODEPOSITION

[75] Inventors: Werner T. Raudenbusch; Gerardus C. M. Schreurs; Petrus G. Kooÿmans; Josepha M. E. Seelen-Kruijssen, all of Amsterdam, Netherlands

[73] Assignee: Shell Oil Company, Houston, Tex.

[21] Appl. No.: 912,825

[22] Filed: Jun. 5, 1978

[30] Foreign Application Priority Data

Jun. 13, 1977 [GB] United Kingdom ............... 24611/77

[51] Int. Cl.$^2$ ............................................. C08G 59/14
[52] U.S. Cl. ........................ 260/29.2 EP; 204/181 C; 260/18 FF; 528/87; 528/113; 528/118; 528/121
[58] Field of Search ................ 528/87, 113, 118, 121; 260/29.2 EP, 18 PF

[56] References Cited

U.S. PATENT DOCUMENTS

| | | | |
|---|---|---|---|
| 3,804,786 | 4/1964 | Sekmakas | 260/18 PT |
| 3,839,252 | 10/1974 | Bosso et al. | 260/29.2 EP |
| 3,962,165 | 6/1976 | Bosso et al. | 260/29.2 EP |
| 4,069,210 | 1/1978 | Schimmel | 260/29.2 EP |

FOREIGN PATENT DOCUMENTS 1307585 2/1973 United Kingdom.
1461823 1/1977 United Kingdom.

*Primary Examiner*—Earl A. Nielsen

[57] ABSTRACT

Novel resinous binders useful for coating articles by cathodic electrodeposition are described. These binders contain tertiary amino groups and are derived from glycidyl esters of alpha-branched monocarboxylic acids containing from 6 to 20 carbon atoms in the acid group.

14 Claims, No Drawings

EPOXY RESIN/AMINE ADDUCTS FOR CATIONIC ELECTRODEPOSITION

BACKGROUND OF THE INVENTION

It is known to coat electrically conducting articles with resinous binders containing tertiary amino groups by means of cathodic electrodeposition. Generally such articles are immersed in an aqueous coating composition comprising the resinous binder in the form of a salt thereof and a cross-linking agent, and an electrical current passed between the article (cathode) and an anode which deposits the resinous binder on the article which is then stoved to cure or cross-link the resinous binder.

Known resinous binders having tertiary amino groups may be represented by the formula:

$$A_1 - B_1 + C_1 - B_1 +_m A_1 \qquad (I)$$

wherein m is 0 or an integer of from 1 to 6,
each $A_1$, is the same or different tertiary amino group,
$B_1$, or each $B_1$ which may be the same or different, is a group of formula:

wherein n is 0 or an integer of from 1 to 10, and R is a dihydric phenol residue, and
$C_1$, or each $C_1$ which may be the same or different, is a group derived from a compound having at least two sites capable of reacting with glycidyl ether groups.

Resinous binders of this type, wherein $C_1$ is derived from a diamine or a primary monoamine, are known from U.K. Pat. No. 1,461,823. A disadvantage of such binders is that they produce rough, incoherent coatings having poor corrosion resistance on bare steel substrates, i.e., steel which has not been phosphated. It has also been proposed to incorporate residues of unsaturated fatty acids into such resinous binders, e.g., see U.K. Pat. No. 1,307,585. Although such binders form smoother coatings on bare steel substrates they still have a poor corrosion resistance.

It has now found that if such binders contain at least one group derived from a glycidyl ester of a $C_6$ to $C_{20}$ carboxylic acid then the coatings prepared therefrom are smooth and glossy and have good corrosion resistance even when deposited upon bare steel substrates.

SUMMARY OF THE INVENTION

The present invention is directed to novel resinous binders containing tertiary amino groups which are especially useful for coating articles by means of cathodic electrodeposition. The present invention is also concerned with the preparation of such binders as well as to coating compositions containing them. Generally, the instant binders are prepared by reacting (A) an amino-containing adduct prepared by reacting a glycidyl ether of a polyhydric phenol with a secondary monoamine with (B) a glycidyl ester of an alpha-branched monocarboxylic acid containing from about 6 to 20 carbon atoms in the acid molecule.

DESCRIPTION OF THE PREFERRED EMBODIMENT

The present invention is concerned with a resinous binder of formula:

wherein m is 0 or an integer of from 1 to 6,
each A is the same or different tertiary amino group,
B, or each B which may be same or different, is a group of formula:

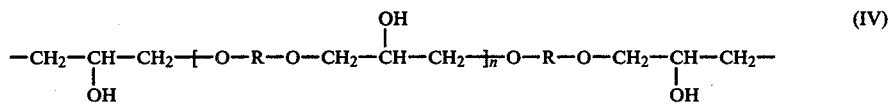

wherein n is 0 or an integer of from 1 to 10, and R is a dihydric phenol residue; and
C, or each C which may be the same or different, is a group derived from a compound having at least two sites capable of reacting with glycidyl ether groups, with the proviso that at least one of the groups A, B or C is substituted by at least one group ($R_1$) wherein $R_1$ has the formula:

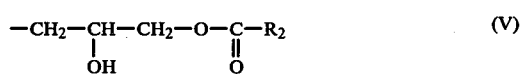

wherein $R_2$ is a $C_6$ to $C_{20}$ alkyl group.

The preferred resinous binders of formula III will be described with reference to the following description of the methods of preparing such resinous binders. In general, the group $R_1$ is incorporated by the reaction between a glycidyl ester of formula:

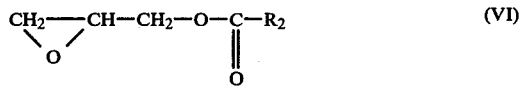

wherein $R_2$ is a $C_6$ to $C_{20}$ alkyl group, and a primary of secondary amino, hydroxyl or acidic, e.g., carboxylic acid, group. This reaction may take place as the final step in the preparation of the binder, i.e., by reacting a resinous binder of formula I directly or indirectly with a glycidyl ester of formula VI or may take place by pre-reacting one of the components from which the binder is prepared with a glycidyl ester of formula VI. It will be understood by those skilled in the art that the structures given herein represent the average structure of a mixture of reaction products.

Suitable glycidyl esters of formula VI and their preparation are well known in the art. See, for example, U.S. Pat. No. 3,178,454, issued Apr. 12, 1965.

One suitable method (method I) of preparing resinous binders of formula III comprises reacting a resinous binder of formula I with
(A) a glycidyl ester of formula VI, or (B) a cyclic carboxylic anhydride and a glycidyl ester of formula VI.

The resinous binders of formula I are prepared by reacting a diglycidyl ether of formula:

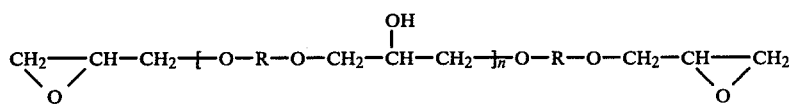

(VII)

wherein n and R are as hereinbefore defined, with a secondary monoamine and, optionally, a compound having at least two sites capable of reacting with glycidyl eher groups, in amounts such that the number of epoxy equivalents of the diglycidyl ether is substantially equal to the number of reactive sites of the other reactants.

The amounts of the reactants which are used depend upon the desired "m" value of the resinous binder of formula I. For example, resinous binders, wherein m is 0, are obtained by reacting about 2 epoxy equivalents of the diglycidyl ether with about 2 moles of the secondary monoamine; resinous binders, wherein m is 1, are obtained by reacting about 4 epoxy equivalents of the diglycidyl ether with about 2 moles of the secondary monoamine and about 1 mole of the compound having at least two sites capable of reacting with glycidyl ether groups; resinous binders, wherein m is 2, are obtained by reacting about 6 epoxy equivalents of the diglycidyl ether with about 2 moles of the secondary monoamine and about 2 moles of the compound having at least two sites capable of reacting with glycidyl ether groups; and resinous binders, wherein m is 3, are obtained by reacting about 8 epoxy equivalents of the diglycidyl ether with about 2 moles of the secondary monoamine and about 3 moles of the compound having at least 2 sites capable of reacting with glycidyl ether groups.

The diglycidyl ethers of formula VII are well known compounds and are available commercially usually as mixtures of compounds having on average more than one glycidyl group per molecule. Preferred diglycidyl ethers are those wherein R is a group of formula:

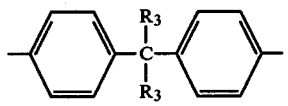

(VIII)

wherein each $R_3$, which may be the same or different, is H or a $C_1$ to $C_4$ alkyl group. Most preferred diglycidyl ethers are those wherein both $R_3$ groups are methyl groups. Suitably n has an average value of from 0 to 8.

Very suitable glycidyl ethers are the reaction products of an epiholohydrin, such as epichlorohydrin, with a polyhydric phenol, such as Bisphenol A. Such glycidyl ethers and their preparation are well-known in the art. See, for example, U.S. Pat. No. 2,970,983, among a multitude of other patents and literature.

Suitable secondary monoamines are heterocyclic amines, e.g., piperidine and morpholine; dialkylamines, such as di ($C_1$ to $C_6$) alkylamines, e.g., dimethylamine, diethylamine, dipropylamines, dibutylamines dipentylamines and methylethylamine; dialkanolamines, such as di($C_1$ to $C_6$)alkanolamines, e.g., diethanolamines and dipropanolamines and N-alkyl-alkanolamines such as N-($C_1$ to $C_6$)alkyl($C_1$ to $C_6$)alkanolamines, e.g., N-methyl ethanolamine. The secondary monoamines may be further substituted, e.g., by alkoxy or carboxyl groups. It can be seen from formula I that such resinous binders have at least two secondary hydroxyl groups which are capable of reacting in method I (A) or (B). However, it is considered desirable to use as the secondary monoamine an alkanolamine since the resulting resinous binders have additional hydroxyl groups which may also react in method I (A) or (B); consequently, it is possible to react more of the components in (A) or (B) and to produce a resinous binder of formula III which in addition to having $R_1$ groups also has several unreacted hydroxyl groups which is considered to be advantageous insofar as such binders are to be used in cathodic electrodeposition processes. The most preferred secondary monoamines are diethanolamine and di-iso-propanolamine.

Suitable compounds having at least two sites capable of reacting with glycidyl ether groups, and which therefore form the linkage(s) $C_1$, are aliphatic polyols such as alkylene glycols and polyoxyalkylene glycols, e.g., hexylene glycol, polyoxyethylene glycol and polyoxpropylene glycol; polyhydric phenols, e.g., diphenlolmethane and diphenylolpropane; aliphatic or aromatic polycarboxylic acids or anhydrides thereof, e.g., maleic, succinic, dodecenylsuccinic, glutaric, adipic, phthalic, tetrahydrophthalic, hexahydrophthalic, endomethylene tetrahydrophthalic, methyl endomethylene tetrahdrophthalic anhydride and trimellitic anhydride; polyamines containing at least two primary/-secondary amino groups, such as $C_2$ to $C_{10}$ alkylene primary diamines, poly($C_2$ to $C_{10}$)alkylene polyamines and polyether primary diamines, e.g., ethylene diamine, hexylene diamine, diethylene triamine, triethylene tetramine, 4,9-dioxa-1.12-dodecane diamine; and primary monoamines such as $C_1$ to $C_6$ alkyl primary amines and mono ($C_1$ to $C_6$)alkanol primary amines, e.g., methylamine, ethylamine, propylamines, butylamines, monoethanolamine and mono-iso-propanolamine. Such primary monoamines may also be substituted by alkoxy groups, e.g., 3-ethoxy propylamine; carboxyl groups, e.g., glycine, alaine, p-amino benzoic acid; or sulphoxyl groups, e.g., sulphanilic acid.

The preparation of the resinous binders of formula I may be carried out at elevated temperatures, e.g., at a temperature in the range of from 50 to 105° C. and in the presence of non-reactive solvents such as glycol ethers and ketones. It will be appreciated that mixtures of diglycidyl ethers of formula VII, mixtures of secondary monoamines and/or mixtures of compounds having two reactive sites capable of reacting with glycidyl groups may be used.

The resinous binders of formula I may then be etherified with a glycidyl ester of formula VI (method I(A)). Preferred esters are glycidyl esters of saturated aliphatic moncarboxylic acids in which the carboxyl group is attached to an alpha-branched carbon atom, i.e., a tertiary or quaternary carbon atom, and which carboxylic acids have preferably 9 to 11 carbon atoms per molecule. The amount of glycidyl ester used may vary considerably and will depend on the number of reactive sites available in the resinous binder of formula I. The reaction may be carried out at a temperature of from 50 to 150° C. and in the presence of non-reactive solvents such as glycol ethers and ketones. Catalysts may be used, e.g., quaternary ammonium salts or hydroxides, phosphonium salts, tertiary amines or phosphines or salts thereof, alkali metal hydroxides, lithium halides and stannous salts of monocarboxylic acids.

Alternatively the resinous binders of formula I may be reacted with a cyclic dicarboxylic anhydride and a glycidyl ester of formula VI (method I(B)). Preferred glycidyl esters are those described above. Preferred cyclic carboxylic anhydrides which may also contain a carboxylic acid group, are the anhydrides of aliphatic cyclic dicarboxylic acids such as maleic, succinic, dodecenylsuccinic, glutaric and adipic acids, and carboxylic anhydrides such as the anhydrides of aromatic or alicyclic dicarboxylic acids, e.g., phthalic, tetrahydrophthalic, hexahydropthalic, endomethylene tetrahydrophthalic and methyl endomethylene tetrahydrophthalic acids. Examples of anhydrides containing a further carboxlyic acid group are trimellitic anhydride and adducts of maleic anhydride and ethylenically unsaturated fatty acids. The amount of anhydride used may vary considerably and depends on the number of reactive sites of the resinous binder 2 of formula I but is suitably from 0.5 to 4.5 moles per mole of resinous binder of formula I. The amount of the anhydride and glycidyl ester may vary considerably but is preferably such that the resinous binder of formula III is substantially free of carboxylic acid groups. The reaction is suitably carried out at a temperature of from 50 to 150° C. and may be carried out in the presence of non-reactive solvents such as glycol ethers and ketones.

Another suitable method (method II) of preparing resinous binders of formula III comprises reacting a diglycidyl ether of formula VII with a secondary monoamine and, optionally, a compound having at least two sites capable of reacting with glycidyl ether groups, wherein at least one of the reactants is substituted by at least one $R_1$ group as defined above and wherein the amounts of the reactants are such that the number of epoxy equivalents of the diglycidyl ether is substantially equal to the number of reactive sites of the other reactants.

Method II is particularly suitable for preparing resinous binders of formula III wherein m is from 1 to 6 by reacting a diglycidyl ether of formula VII, a secondary monoamine and the reaction product of
(A) a glycidyl ester of formula VI, and
(B) a compound having at least three sites capable of reacting with glycidyl groups wherein the amounts of (A) and (B) are such that the reaction product has at least two sites capable of reacting with glycidyl ether groups.

The amounts of the reactants which are used in the preferred method II depend upon the desired "m" value of the resinous binder in the same way as described above for the preparation of resinous binders of formula I. For example, resinous binders of formula III, wherein m is 1, are obtained by reacting about 4 epoxy equivalents of the diglycidyl ether with about 2 moles of the secondary amine and about 1 mole of the reaction product of (A) and (B) and so on. Suitable diglycidyl ethers, secondary monoamines and glycidyl esters are described above. Suitable compounds of type (B) are polyamines containing at least two primary amino groups, such as $C_2$ to $C_{10}$ alkylene primary diamines, poly($C_2$ to $C_{10}$)alkylene polyamines and polyether primary diamines of the type discussed above with hexamethylene diamine being preferred, and compounds containing a cyclic carboxylic anhydride group and a carboxylic acid group of the type discussed above with trimellitic anhydride or trimellitic anhydride/polyoxyalkylene glycol adducts being preferred. Such adducts may be prepared by reacting a polyoxyalkylene glycol with about 200 mole % of trimellitic anhydride. Insofar as compound (B) is a polyamine, preferred reaction products are obtained by reacting about 1 mole of an alkylene primary diamine with about 2 epoxy equivalents of the glycidyl ester of formula VI. Insofar as compound (B) is the above adduct, preferred reaction products are obtained by reacting the adduct with about 2 epoxy equivalents of the glycidyl ester of formula VI. The above method may be carried out in several stages, e.g., the diglycidyl ether of formula VII may be pre-reacted with the secondary monoamine. All of the above reactions may be carried out at elevated temperature, e.g., at a temperature of from 50° to 150° C., and in the presence on non-reactive solvents such as glycol ethers and ketones.

The resinous binders of formula III may contain from 1 to 6, preferably 2 to 4 groups, derived from the glycidyl ester of formula VI. Usually the weight of such groups varies from about 10 to 50% weight of the resinous binder. Moreover, preferred resinous binders of formula III have a hydroxyl content of from 200 to 600 meq/100 g. In addition, preferred resinous binders have preferred calculated average molecular weights of from 2000 to 5000.

As stated above, the resinous binders of formula III are particularly suitable as components of aqueous coating compositions for use in cathodic electrodeposition processes. Accordingly, the invention is also concerned with an aqueous coating composition comprising
(i) water,
(ii) a resinous binder of formula III,
(iii) an acid in an amount sufficient to neutralize at least about 30% of the amino groups of the resinous binder, and
(iv) a water-miscible corss-linking agent.

Suitable compositions comprise about 2 to 20 %w of the resinous binder of formula III. The acid, which has the effect of making the resinous binder water-soluble as well as making it susceptible to cathodic electrodeposition may be inorganic, e.g., hydrochloric, sulphuric acid, or organic, e.g., formic, acetic, maleic citric or lactic acid, with lactic acid being preferred. Preferably from 50 to 100% of the amino groups are neutralized by the acid. Suitable cross-linking agents include melamine/formaldehyde; benzoguanamine/formaldehyde; urea/formaldehyde and phenol/formaldehyde resins with alkoxylated melamine, e.g., hexamethoxymethylmelamine resins (CYMEL ® Resins) being preferred. Suitable amounts of cross-linking agents are from 1 to 50 %w, preferably from 5 to 25 %w, based on the weight of the resinous binder of formula III. The aqueous compositions may also contain other components such as solvents, e.g., glycol ethers, pigments, fillers dispersing agents, etc.

The aqueous coating compositions are preferably prepared by dissolving the resinous binder in a solvent such as a glycol ether, adding the cross-linking agent and acid followed by the addition of water, preferably demineralized water. Suitably the compositions have a pH of from 3.0 to 6.0. Although the compositions are particularly suitable for coating bare steel substrates, they may also be used for coating phosphatized steel substrates.

The invention will be illustrated with reference to the following examples. It will be appreciated that the following examples are for the purpose of illustration only and are in no way intended to limit the invention to the particular compositions illustrated. Modifications within the spirit and scope of the present invention will become apparent to those skilled in the binders and coatings art. Parts and percentages are by weight unless otherwise noted. The glycidyl ester of $C_9$ to $C_{11}$ alpha-branched acids had an epoxy equivalent weight of about 250. Aliphatic hydroxy content was on non-volatiles.

EXAMPLE 1 (comparative)

A solid diglycidyl ether of bisphenol A (1786 g; 2.0 epoxy equivalents; n value of about 6) was melted and reacted with diethanolamine (210 g; 2.0 mole) at 135° C. for 5 hours.

The resulting resinous binder had a nitrogen content of 1.00 meq/g, a residual epoxy content of below 0.02 meq/g and a calculated aliphatic hydroxy content of about 600 meq/100 g.

EXAMPLE 2

A resinous binder (200 g, 0.1 mole) prepared according to Example 1 was melted and mixed with succinic anhydride (20 g, 0.2 mole) for 5 minutes at 145° C. A glycidyl ester of $C_9$ to $C_{11}$ alpha-branched acids (60 g; 0.24 epoxy equivalents) was added and the reaction continued for 1 hour at 135° C. The resulting resinous binder had a nitrogen content of 0.71 meq/g, an acid content of 0.04 meq/g and a calculated aliphatic hydroxy content of about 430 meq/100 g. About 21.4 %w of the resinous binder was derived from the glycidyl ester.

EXAMPLE 3

A resinous binder (200 g; 0.1 mole) prepared according to Example 1 was melted and reacted with a $C_9$ to $C_{11}$ glycidyl ester of alpha-branched acids (74.4g; 0.3 epoxy equivalents) in the presence of benzyldimethylamine (0.27 g), as etherification catalyst, for 6 hours at 140° C. The resulting resinous binder had a nitrogen content of 0.73 meq/g; a residual epoxy equivalent of 0.03 meq/g and a calculated aliphatic hydroxy content of about 440 meq/100 g. About 27.1 %w of the resinous binder was derived from the glycidyl ester.

EXAMPLE 4 (comparative)

A mixture of a solid diglycidyl ether of bisphenol A (566 g; 1.2 epoxy equivalents; n value of about 2), diisopropanolamine (79.8 g; 0.6 mole) and isopropanolamine (22.5 g; 0.3 mole) was melted and reacted at 140° C. for 3 hours.

The resulting resinous binder had a nitrogen content of 1.35 meq/g, a residual epoxy content of 0 and a calculated aliphatic hydroxy content of about 670 meq/100 g.

EXAMPLE 5

A resinous binder (223 g; 0.3 mole) prepared according to Example 4 was melted and a blend of trimellitic anhydride (19.2 g; 0.1 mole), a glycidyl ester of $C_9$ to $C_{11}$ alpha-branched acids (62.5 g; 0.25 epoxy equivalents) and dry acetone (40 g) added gradually (over 0.5 hour) thereto whilst maintaining the temperature at 130° C. and distilling off the acetone. After addition, the reaction was continued for 2 hours at 135° C. The resulting resinous binder had a nitrogen content of 0.98 meq/g, an acid content of 0.02 meq/g, an epoxy content of 0.08 meq/g and a calculated aliphatic hydroxy content of about 500 meq/100 g. About 20.5 %w of the resinous binder was derived from the glycidyl ester.

EXAMPLE 6 (comparative)

(a) A solid diglycidyl ether of bisphenol A (944 g; 2 epoxy equivalents; n value of about 2) was dissolved in ethylene glycol monobutylether (450 g) and reacted with diisopropanolamine (133 g; 1.0 mole) at 80° C. for 3 hours after which 50% of the epoxy groups had reacted. The resulting solution had a residual epoxy content of 0.65 meq/g solution and a solids content of 70.53 %w.

(b) This solution (615 g; containing 0.4 epoxy equivalents) was added gradually over a period of 1 hour to a solution of hexamethylene diamine (23.2 g; 0.2 mole) in ethylene glycol monobutylether (20 g) at a temperature of 80° C., after which the reaction was continued at 80° C. for 2 hours. The resulting solution of resinous binder had a nitrogen content of 1.22 meq/g solution, an epoxy content of 0 and a calculated solids contents of 69.4 %w.

EXAMPLE 7

Example 6 was repeated with the difference that in step (b) the solution obtained in step (a) was added to a solution obtained as follows:

Hexamethylene diamine (23.2g, 0.2 mole) was heated in ethylene glycol monobutylether (20 g) to 80° C., after which a glycidyl ester of $C_9$ to $C_{11}$ alpha-branched acids (100 g, 0.4 epoxy equivalents) was added gradually for a period of 1 hour at 80° C. The reaction was continued for 1 hour at 80° C.

The resulting solution of resinous binder had a nitrogen content of 1.05 meq/g solution and a calculated solids content of 73.5 %w.

About 17.9 %w of the resinous binder was derived from the glycidyl ester.

EXAMPLE 8

(a) A solution was prepared by dissolving trimellitic anhydride (192 g; 1.0 mole) in dry acetone (300 g) and adding thereto a glycidyl ester of $C_9$ to $C_{11}$ alpha-branched acids (250 g; 1.0 epoxy equivalent).

(b) Polypropylene glycol having a molecular weight of 420 (210 g; 0.5 mole) was heated to 135° C. after which the solution obtained in (a) above was added gradually (over 1 hour) whilst maintaining the temperature at 130° C. and distilling off the acetone. After addition the reaction was continued for 3 hours at 135° C. The product, a viscous, liquid, had an acid content of 1.58 meq/g.

(c) The product (130.4 g; 0.1 mole) obtained in (b) above was reacted with a diglycidyl ether of bisphenol A (189 g; 0.4 epoxy equivalents value of about 2) and diethanolamine (21.0 g; 0.2 mole) at a temperature of 130° C. for 2 hours. The resulting resinous binder had a nitrogen content of 0.62 meq/g, an acid content of 0.09 meq/g and a calculated aliphated hydroxyl content of 470 meq/100 g. About 14.7 %w of the resinous binder was derived from the glycidyl ester.

EXAMPLE 9

A glycidyl ester of $C_9$ to $C_{11}$ alpha-branched acids (250 g; 1.0 epoxy equivalents) was added gradually (over 0.5 hour) to a solution of ethylene diamine (30 g; 0.5 mole) in ethylene glycol monobutyl ether (50 g). The temperature was not allowed to exceed 80° C. The resulting clear solution had an epoxy value of 0. A solution of sulphanilic acid (17.3g, 0.1 mole) and diethanolamine (42.0 g, 0.4 mole) in water (30 g) was then added followed by a solution of a liquid diglycidyl ether of bisphenol A (304 g; 1.6 epoxy equivalents) in ethylene glycol monobutyl ether (170 g). The mixture was then stirred at 80° C. for 1 hour and at 110° C. for 2 hours. The resulting clear solution had a nitrogen content of 1.81 meq/g solution, an epoxy content of 0, a residual acid content of 0.10 meq/g solution and a solids content of 72.0 %w. About 38.8 %w of the resinous binder was derived from the glycidyl ester.

EXAMPLE 10 (comparative)

A resinous binder (200 g; 0.1 mole) prepared according to Example 1 was reacted with linseed oil fatty acid (54.6 g, 0.2 mole) in the presence of toluene (25 g) and stannous octotate (0.8 g) at 220° C. for 1 hour whilst removing the water of esterification (335 g) and toluene (20 g) azeotropically. The resulting resinous binder had a nitrogen content of 0.76 meq/g and a residual acid value of 0.02 meq/g.

EXAMPLES 11 to 20

Coating compositions were prepared from the resinous binders, or solutions therof, obtained in Examples 1 to 10. The general procedure was to dissolve the resinous binder, if necessary, in a solvent (ethylene glycol monobutyl ether was used except in Examples 14, 15 and 18 where a mixture of this ether (16.7 g) and isophorone (8.3 g) was used) followed by the addition of a cross-linking agent "CYMEL 301" (hexamethoxymethyl melamine) and lactic acid. Demineralized water was then added slowly. In all Examples the compositions had a 10 %w solids content. The amounts of the components are given in Table 1.

Table 1

| Ex. | Resinous binder or solution thereof Example | amount (g) | Solvent (g) | Cross-linking agent (g) | Lactic acid (90 %w aqueous solution) (g) | Demineralized water (g) | %N neutralized | pH |
|---|---|---|---|---|---|---|---|---|
| 11[1] | 1 | 95 | 43 | 5 | 9.5 | 847.5 | 100 | 3.8 |
| 12 | 2 | 95 | 43 | 5 | 6.7 | 850 | 100 | 3.5 |
| 13 | 3 | 100 | 25 | 5.3 | 7.3 | 918 | 100 | 4.2 |
| 14[1] | 4 | 100 | 25 | 11.1 | 10.1 | 965 | 75 | 4.0 |
| 15 | 5 | 100 | 25 | 7.4 | 7.4 | 967 | 75 | 4.2 |
| 16[1] | 6 | 144[2] | — | 25 | 8.8 | 1072 | 50 | 5.8 |
| 17 | 7 | 136[2] | 8 | 25 | 7.2 | 1074 | 50 | 4.4 |
| 18 | 8 | 100 | 25 | 11.1 | 5.1 | 970 | 82 | 4.1 |
| 19 | 9 | 139[2] | — | 5.3 | 11.5 | 897 | 100 | 4.0 |
| 20[1] | 10 | 95 | 43 | 5 | 7.2 | 850 | 100 | 3.4 |

[1]comparative
[2]solutions

EXAMPLES 21 to 30

The coating compositions prepared according to Examples 11 to 20 were cathodically electrodeposited onto solvent degreased steel panels at a temperature of 25±1° C. and voltages of from 50 to 200 volts (direct current). The coatings were cured at 180° C. for 30 minutes. The panels were examined visually and the thickness of the coatings determined. The coated panels obtained from compositions of the present invention were then subjected to a salt spray corrosion resistance test (ASTM B 117-64; 10 days). The appearances of the coated panels prepared from the comparative compositions, except Example 30, were such that it was not considered worthwhile to carry out this salt spray test. The results are given in Table II.

In addition the procedure was repeated after storing the compositions of the present invention for 4 weeks at 40° C. Substantially, the same results were obtained.

Table II

| Ex. | Coating Composition Example | Coating Thickness (mm) | Coating Appearance | Salt spray test mm loss of adhesion from scratch |
|---|---|---|---|---|
| 21[1] | 11 | 15-30 | rough incoherent | — |
| 22 | 12 | 22-25 | smooth, glossy | 4-5 |
| 23 | 13 | 22-24 | smooth glossy | 5-10 |
| 24[1] | 14 | 20-30 | rough, incoherent | — |
| 25 | 15 | 24-26 | smooth, glossy | 4-6 |
| 26[1] | 16 | 20-30 | rough, incoherent | — |
| 27 | 17 | 22-24 | smooth, glossy | 5 |
| 28 | 18 | 22-23 | smooth, glossy | 5 |
| 29 | 19 | 22-24 | smooth, glossy | 8-10 |
| 30[1] | 20 | 26-28 | smooth | 50[2] |

[1]comparative
[2]total loss of adhesion

What we claim is:

1. A resinous binder of the general formula ti A—B--C—B--$_m$A wherein m is zero or an integer of from 1 to 6, each A is the same or different tertiary amino group, each B is the same or different group of the formula

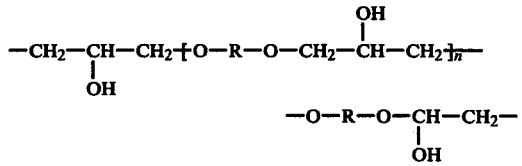

wherein n is zero or an integer of from 1 to 10 and R is a dihydric phenol residue; and each C, which is the same or different, is a group derived from a compound having at least two sites capable of reacting with glycidyl ether groups, and wherein at least one of the groups A, B or C is substituted by at least one group of the general formula

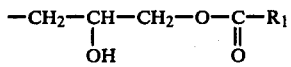

wherein $R_1$ is a $C_6$ to $C_{20}$ alkyl group.

2. A process for preparing the resinous binders of claim 1 which comprises reacting A. The reaction product of a glycidyl ether of the formula

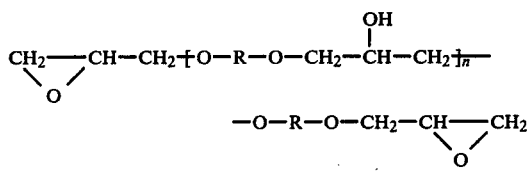

wherein n is an integer from 0 to 10, and R is a dihydric phenol residue, with a secondary monoamine, and, optionally, a compound having at least two sites capable of reacting with glycidyl ether groups, in amounts such that the number of epoxy equivalents of the diglycidyl ether is substantially equal to the number of reactive sites of the other reactants, with B. (1) a glycidyl ester of the general formula

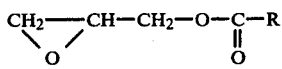

wherein R is a $C_6$ to $C_{20}$ alkyl group, or (2) a cyclic carboxylic anhydride and a glycidyl ester of B (1).

3. The process of claim 2 wherein the glycidyl ether is a diglycidyl ether of a polyhydric phenol.

4. The process of claim 3 wherein the diglycidyl ether is derived from bisphenol A.

5. The process of claim 2 wherein the secondary monoamine is heterocyclic amine.

6. The process of claim 2 wherein the secondary monoamine is a dialkylamine or dialkanolamine.

7. The process of claim 6 wherein the dialkanolamine is diethanolamine.

8. The process of claim 6 wherein the dialkanolamine is diisopropanolamine.

9. The process of claim 2 wherein the glycidyl ester is a glycidyl ester of a alpha-branched monocarboxylic acid having 9 to 11 carbon atoms in the acid molecule.

10. The process of claim 2 wherein the cyclic carboxylic anhydride is trimellitic anhydride.

11. An aqueous coating composition suitable for cathodic electrodeposition comprises:
   1. water,
   2. the resinous binder of claim 1,
   3. an acid in an amount sufficient to neutralize at least 30% of the amino groups of the resinous binder, and
   4. a water-miscible cross-linking agent.

12. The composition of claim 10 wherein the acid is an organic acid.

13. The composition of claim 12 wherein the organic acid is lactic acid.

14. The composition of claim 2 wherein the water-miscible curing agent is hexamethoxymethylmelamine.

* * * * *